J. F. PETER.
COMBINED MEASURE AND STOPPER.
APPLICATION FILED FEB. 6, 1913.
1,076,780.
Patented Oct. 28, 1913.
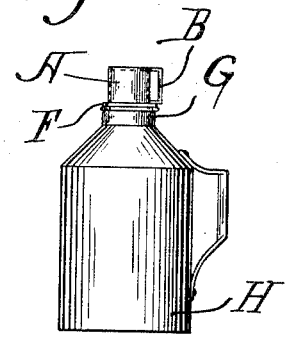
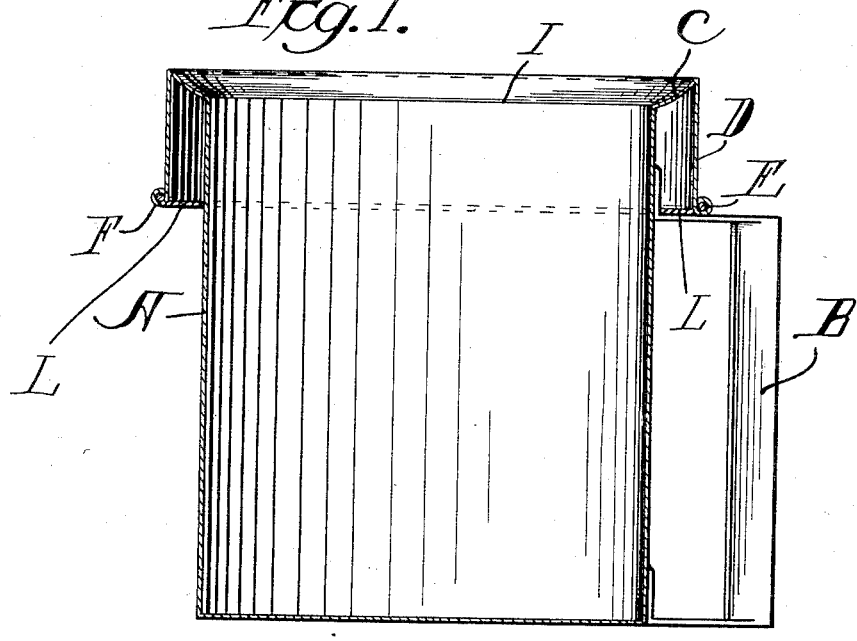
Witnesses:
S. L. Waschenberger
H. L. Fischer
Inventor:
Julius F. Peter,
by: Bradbury
Attorney.

UNITED STATES PATENT OFFICE.

JULIUS F. PETER, OF ST. PAUL, MINNESOTA.

COMBINED MEASURE AND STOPPER.

1,076,780.  Specification of Letters Patent.  Patented Oct. 28, 1913.

Application filed February 6, 1913.  Serial No. 746,435.

*To all whom it may concern:*

Be it known that I, JULIUS F. PETER, a citizen of the United States, residing at St. Paul, in the county of Ramsey and State of Minnesota, have invented a new and useful Improvement in a Combined Measure and Stopper, of which the following is a specification.

The object of this invention is to provide a combined measure and stopper, which is sanitary and can be used either as a measure or as a cover for milk cans or other receptacles.

A further object is to so construct the invention as to catch the drip when milk or other liquid is poured into the measure, and which enables the user to measure out a given quantity of liquid to the top of the body of the measure without danger of spilling.

Further objects will be apparent from the following description, in which the accompanying drawing forms part thereof.

In the drawing, Figure 1 is a vertical section of my invention, and Fig. 2 is a side elevation of a milk can showing my invention when used as a stopper for closing the can.

In the drawing A indicates a cylindrical receptacle, closed at its lower end, and provided on one side with any suitable handle, such as B. The upper end of the side of the receptacle is formed with an outwardly flaring lip C, and the outer edge of this lip is turned down into a cylindrical collar D, the wall of which is of even diameter throughout the height of the collar and spaced from the side A of the receptacle. The lower end of the collar D forming the stopper is turned over a wire ring E for the purposes of reinforcing the strength of the stopper and also acting as a stop F. This stop is adapted to define the distance the stopper is inserted in the neck G, of a milk can H or other receptacle, to fully close the milk can and impinges against the upper edge of the neck G. The lip C is curved downwardly and inwardly from the upper edge of the collar D of the stopper to the wall of the receptacle A, thus producing an edge I, which is adapted to indicate the level to which a given quantity of liquid is to be measured by the measuring receptacle. Should the level exceed the edge I, the surplus will not overflow from the measuring receptacle, but can be poured away until the desired level is reached. Thus, the danger of spilling or filling the receptacle too full is avoided. The inwardly sloping lip C also serves to catch any drip from the milk can when the milk is being poured into the receptacle and in this manner the device besides performing the functions of a measure and stopper is sanitary.

The space between the collar and side of the receptacle is closed by a thin ring L which is soldered or otherwise secured to the connected parts or made integral therewith. Thus a dead air cell is formed around the collar which tends to prevent the collar freezing in the neck of the milk can and also the milk in said neck from freezing. By closing the space within the collar and around the receptacle the chance for dirt to collect on the walls of the device is reduced and the invention made more sanitary.

The shape of the measuring receptacle may be modified within the spirit of my invention, for instance its side wall need not be cylindrical, but may be conical when desired, such modification being clearly obvious. The method of forming the shoulder F may also be variously modified, and it is not necessary in order to produce that feature to roll the edge of the collar over the reinforcing body E. When desired the sealing ring L may be made integral with the collar.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A combined measure and stopper, comprising, a receptacle having a wall around its upper end spaced from the side of said receptacle and connected to said side by a lip at its upper end.

2. A combined measure and stopper, comprising, a receptacle having a stopper wall around its upper end and spaced from its side, the upper ends of said side and stopper wall being connected by an inwardly trending lip and the space between said side and stopper wall being sealed to form a dead air space, for the purposes specified.

3. A combined measure and stopper, comprising, a receptacle having a stopper wall around its upper end and spaced from its side and connected by a downwardly and inwardly extending lip for the purposes specified.

4. A combined measure and stopper, comprising, a receptacle having a cylindrical stopper wall around its upper end and spaced from its side, said wall being connected to said side by a downwardly and inwardly extending lip, and the lower edge of said wall being formed with an outwardly projecting stop shoulder, adapted to limit the insertion of the stopper wall in the neck of a receptacle.

5. A combined measure and stopper, comprising, a receptacle having a cylindrical collar D, spaced from the wall of said receptacle, and adapted to form the side of the stopper, a lip C curved downwardly and inwardly from the upper edge of said collar to the upper edge of the wall of said receptacle, and a shoulder F formed on the lower edge of said collar, said collar being turned down from said lip along and spaced from the side of said receptacle.

In testimony whereof, I have signed my name to this specification, in the presence of two subscribing witnesses.

JULIUS F. PETER.

Witnesses:
A. L. FISCHER,
F. G. BRADBURY.

---

Copies of this patent may be obtained for five cents each, by addressing the "Commissioner of Patents, Washington, D. C."